United States Patent
Calenzo et al.

(10) Patent No.: US 11,403,480 B2
(45) Date of Patent: Aug. 2, 2022

(54) DEVICE AND METHOD FOR DETERMINING THE PRESENCE, ABSENCE, AND/OR MOVEMENT OF AN OBJECT CONTAINED IN A HOUSING

(71) Applicant: STMicroelectronics (Rousset) SAS, Rousset (FR)

(72) Inventors: Patrick Calenzo, Peypin (FR); Sylvain Coquel, Istres (FR); Julien Terrier, Saint Zacharie (FR); Loic Welter, Chateauneuf-le-Rouge (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 849 days.

(21) Appl. No.: 16/103,583

(22) Filed: Aug. 14, 2018

(65) Prior Publication Data
US 2019/0065888 A1    Feb. 28, 2019

(30) Foreign Application Priority Data
Aug. 28, 2017   (FR) ...................................... 1757921

(51) Int. Cl.
| | |
|---|---|
| B65D 90/48 | (2006.01) |
| G06K 9/00 | (2022.01) |
| G01S 15/04 | (2006.01) |
| G01S 17/02 | (2020.01) |
| G01S 17/42 | (2006.01) |
| G06K 9/62 | (2022.01) |
| G01V 8/10 | (2006.01) |
| G01S 17/04 | (2020.01) |

(Continued)

(52) U.S. Cl.
CPC ........... *G06K 9/6201* (2013.01); *B65D 90/48* (2013.01); *G01S 17/04* (2020.01); *G01V 8/10* (2013.01); *G06V 20/00* (2022.01); *G06V 20/64* (2022.01); *G01S 13/04* (2013.01); *G01S 15/04* (2013.01)

(58) Field of Classification Search
CPC ......... B65D 90/48; G01S 13/04; G01S 15/04; G01S 17/04; G01S 17/89; G01S 17/06; G01S 17/87; G01S 7/4817; G01V 8/10; G06K 9/00201; G06K 9/00624; G06K 9/6201; G01C 11/06; G01C 11/00; G06T 7/80
USPC ........ 73/862.46; 345/419, 427, 587; 356/12; 382/157; 702/5, 150, 152, 155, 159
See application file for complete search history.

(56) References Cited

U.S. PATENT DOCUMENTS 5,472,575 A * 12/1995 Parkinson .............. B01D 1/228
                                                          202/205
5,924,833 A *  7/1999 Conboy ............. H01L 21/67276
                                                          414/217

(Continued)

FOREIGN PATENT DOCUMENTS

WO      2016149392 A1    9/2016

*Primary Examiner* — Jeffrey P Aiello
(74) *Attorney, Agent, or Firm* — Slater Matsil, LLP

(57) ABSTRACT

A method for detecting an object in a housing, includes: determining a first scene inside the housing using a time of flight sensor, wherein the housing is empty during determination of the first scene; determining, by a processor, a second scene inside the housing using the time of flight sensor; comparing, by the processor, the first scene with the second scene; and determining, by the processor, a presence or an absence of the object in the housing based on a result of comparing the first scene with the second scene.

22 Claims, 3 Drawing Sheets

(51) Int. Cl.
    *G06V 20/00*    (2022.01)
    *G06V 20/64*    (2022.01)
    *G01S 13/04*    (2006.01)

(56) References Cited

U.S. PATENT DOCUMENTS

| | | | |
|---|---|---|---|
| 9,892,617 B2 * | 2/2018 | Wegelin | G08B 21/245 |
| 9,970,228 B2 * | 5/2018 | Fitzgibbon | E05F 15/42 |
| 10,867,319 B1 * | 12/2020 | Snitselaar | G06Q 30/0269 |
| 2005/0133699 A1 * | 6/2005 | Miremadi | G01V 8/14 |
| | | | 250/221 |
| 2009/0143923 A1 | 6/2009 | Breed | |
| 2015/0253429 A1 * | 9/2015 | Dorrington | G01S 7/4815 |
| | | | 356/5.01 |
| 2015/0355317 A1 * | 12/2015 | Bridges | G01B 11/002 |
| | | | 356/5.01 |
| 2017/0059708 A1 * | 3/2017 | Fitzgibbon | G01S 17/003 |
| 2017/0140550 A1 * | 5/2017 | Zhang | G06T 7/50 |
| 2017/0363721 A1 * | 12/2017 | Yang | G01S 7/4863 |
| 2018/0017668 A1 * | 1/2018 | Cottin | G01S 7/4814 |
| 2018/0033281 A1 * | 2/2018 | Tudhope | G01S 15/88 |
| 2018/0038991 A1 | 2/2018 | Chennakeshu et al. | |

* cited by examiner

DEVICE AND METHOD FOR DETERMINING THE PRESENCE, ABSENCE, AND/OR MOVEMENT OF AN OBJECT CONTAINED IN A HOUSING

CROSS-REFERENCE TO RELATED APPLICATIONS

This application claims priority to French Patent Application No. 1757921, filed on Aug. 28, 2017, which application is hereby incorporated herein by reference.

TECHNICAL FIELD

This disclosure relates generally to the detection of the presence of one or more objects in a space, and in particular embodiments, to a device and method for determining the presence, absence, and/or movement of an object contained in a housing.

BACKGROUND

Certain situations make it necessary to determine whether an object of arbitrary shape, color and construction is present in a housing and/or has been added or removed from the said housing, for example a device for delivering objects storing the objects to be delivered in a box, and whose recipient removes the objects from the box. It is necessary to determine, on the one hand, whether all of the objects contained in the box have been removed or only some of the objects, and, on the other hand, whether the recipient has added an object to the box.

FIG. 1 illustrates an example of such a delivery device.

FIG. 1 illustrates that the delivery device includes a box 1 furnished with a door 2 having a handle. The box 1 includes a presence detection sensor 3 which determines whether objects 4 of shape, color and constructed of materials which differ are contained in the box 1.

The presence detection sensor 3 known from the prior art is for example an infrared detection device, an ultrasound-based detection device, an inductive or capacitive detection device, a radio identification device known by the acronym RFID ("Radio Frequency Identification") or a visual detection device including a camera.

However, the effectiveness of the presence detection devices known from the prior art depends in respect of certain devices on the color of the objects to be detected, in respect of other devices on the materials constituting the objects. Moreover, certain devices known from the prior art do not make it possible to determine whether an object was displaced in a housing, nor the degree of occupancy by the objects of the monitored housing. These limitations are well known to the person skilled in the art.

RFID detection devices require that each object be equipped with an RFID chip, and visual detection devices implement expensive cameras and object visual recognition algorithms that are complex. These two types of detection device have significant energy consumption and require significant financial investment.

Consequently, a need exists to produce a device for detecting presence in a given housing of one or more objects of any shape, color and construction of materials making it possible to determine the degree of occupancy of the said housing while curbing the energy consumption of the device and the implementation of which is convenient.

A need also exists to determine whether an object is displaced in the monitored housing.

SUMMARY

According to modes of implementation and embodiments, it is advantageously proposed to use time of flight sensors which measure three-dimensional scenes contained in a housing in order to determine, by comparing the said scenes, the presence of at least one object contained in the housing.

According to one aspect, there is proposed a method for detecting the presence or the absence of at least one object in a housing. The proposed method includes: a) a first step during which a sensor of flight time type measures a first three-dimensional scene inside the housing devoid of any object; b) a second step during which the sensor of flight time type measures a second scene inside the housing; c) a comparison step during which the said first scene is compared with the second scene; and d) a step of determining the presence or the absence of the object in the said housing, on the basis of the result of the said comparison.

A three-dimensional scene is for example a three-dimensional representation of the interior of the housing obtained for example through a distance mesh.

Advantageously, the implementation of the method does not require a step of calibration prior to the detection of the possible presence of the object in the housing.

Advantageously, the method can include a repetition of the second step at a regular interval.

The device operates intermittently, thereby making it possible to reduce its electrical consumption.

According to one mode of implementation, subsequent to a detection of the presence of the said object, a second comparison is performed between two successive second steps and a possible removal of the object is determined on the basis of the second comparison.

According to another mode of implementation, the method furthermore includes a calculation of the volume occupied by the object in the housing.

Advantageously, the method furthermore includes a calculation of a degree of occupancy of the said volume.

According to yet another mode of implementation, the method includes a reproduction of steps a) to d), set forth above, for a second sensor of the flight time type, and a determination of a displacement of the object inside the housing on the basis of the two determination steps d) respectively associated with the two sensors.

According to another aspect, there is proposed a device for detecting the presence or the absence of at least one object in a housing. The proposed device includes: a sensor of flight time type configured to measure a first three-dimensional scene and a second scene of the housing subsequent to the first scene. The proposed device further includes a processor and/or a plurality of circuits configured to execute a comparison step configured to compare the two scenes; and a determination step configured to determine the presence or the absence of the object in the said housing on the basis of the result of the comparison.

Advantageously, the processor can furthermore execute a timeout step configured to have the sensor repeat the measurement of a scene at regular intervals.

According to another embodiment, the processor further executes a first calculation step configured to calculate the volume occupied by the said object in the housing.

Preferably, the processor further executes a second calculation step configured to calculate a degree of occupancy of the housing.

According to yet another embodiment, the device furthermore includes a second sensor of flight time type configured to measure a three-dimensional scene, the determination step being configured to determine two items of information regarding presence of the object on the basis of three-dimensional scenes respectively measured by the two sensors, and a further determination step configured to determine a displacement of the object inside the housing on the basis of the two items of presence information respectively associated with the two sensors.

BRIEF DESCRIPTION OF THE DRAWINGS

Other advantages and characteristics of the invention will become apparent on examining the detailed description of wholly non-limiting embodiments and the appended drawings in which.

DETAILED DESCRIPTION OF ILLUSTRATIVE EMBODIMENTS

Figure 1:
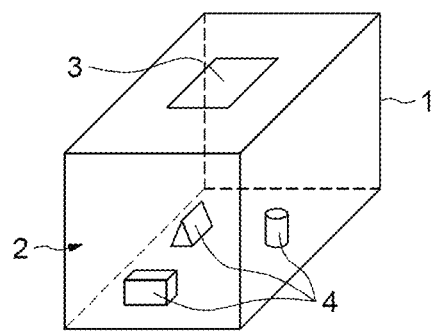
FIG. 1 illustrates a device for detecting presence of objects in a defined volume according to the prior art.
Figure 2:
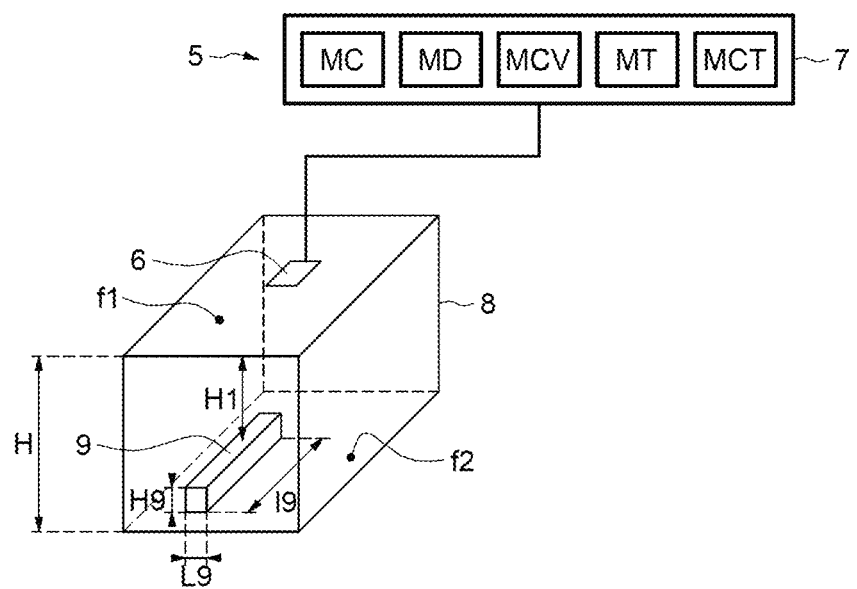
FIGS. 2 to 6 illustrate various embodiments and modes of implementation of the invention.

FIG. 2 is referred to, which represents an exemplary embodiment of a device 5 for detecting presence of at least one object 9 of uniform height H9 and of uniform width L9 in a housing of cubic shape 8 of known capacity.

Here, object is understood to mean a solid thing.

Of course the disclosure is not limited to a housing of cubic shape and an object of uniform height and of uniform width, it would be possible to have a housing of any shape containing one or more objects of variable height and/or of variable width.

The device 5 for detecting the presence or the absence of at least one object includes a sensor 6 of the flight time type (e.g. time of flight sensor) configured to measure a three-dimensional scene inside the housing 8 known by the acronym TOF ("Time of Flight"), a processing unit 7. The processing unit 7 may implement a comparison step MC configured to compare two three-dimensional scenes, a determination step MD configured to determine the presence or the absence of the object 9 in the housing 8 on the basis of the result of the comparison, a first calculation step MCV configured to calculate the volume occupied by an object in the housing 8, a timeout step MT configured to repeat the measurement of a three-dimensional scene by the sensor 6 at regular intervals, a second calculation step MCT configured to calculate the degree of occupancy T of the housing 8.

The processing unit 7 is embodied for example on the basis of a microprocessor, but it may be any device able to process the data provided by the sensor 6. It may in particular be a microcontroller.

The steps MC, MD, MCV, MT and MCT may be embodied for example in software form within a microprocessor, but one may be dealing with any device (e.g. digital or analog device) respectively able to compare two three-dimensional scenes and configured to determine the presence or the absence of an object in a housing on the basis of the result of the comparison, able to calculate the volume occupied by an object in the housing 8, able to have the sensor 6 repeat the measurement of a three-dimensional scene at regular intervals, able to calculate the degree of occupancy T of the housing.

It may in particular be a microcontroller or a part of the processing unit 7 as represented here.

The sensor 6 of the flight time type gives a three-dimensional representation of a scene obtained on the basis of a mesh of distances.

For each zone of the mesh, the time of flight sensor TOF measures a distance separating it from an object by measuring a time span $\Delta t$ elapsed between an emission of a signal of the electromagnetic wave type, such as a laser signal, and the reception of this signal after reflection on an object present in the field of vision of the sensor TOF.

The sensor 6 is disposed on a first face f1 of the housing 8 opposite to a second face f2 of the housing 8 on which the object 9 rests, so that the sensor 6 views the face f2. The two faces f1 and f2 are separated from one another by a distance H.

The sensor 6 establishes in real time a three-dimensional scene of the interior of the housing 8, in particular of the object 9 resting on the face f2.

The distance H9 separates the face f2 and a first end, opposite to the face f2, of the object 9 and a distance H1 separates the face f1 from the second end of the object 9 in such a way that the distance H is equal to the sum of the distances H1 and H9.

Figure 3:
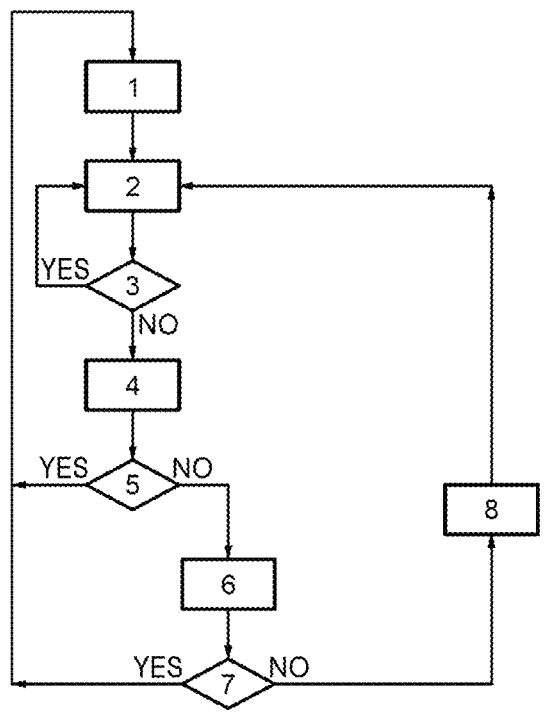

FIG. 3 illustrates an exemplary implementation of a method for detecting the presence or the absence of at least one object 9 in the housing 8 implementing the device 5. It is implemented by the processing unit 7 incorporating the steps MC, MD, MCV, MT, and MCT.

To improve the clarity and the understanding of the exemplary implementation of the method, the housing 8 includes a single object 9.

In a first step 1, the housing 8 does not contain any object, that is to say the housing 8 is empty. The sensor 6 determines a first three-dimensional scene S0 including the face f2. As the housing 8 is cubic and the two faces f1 and f2 are separated from one another by the distance H, the first sensor 6 measures a reference distance H0 of value equal to the value H for the first scene S0 as a whole. The first calculation step MCV determine the value V0 of the empty housing 8 on the basis of the scene S0 according to methods known to the person skilled in the aft.

Stated otherwise, the time of flight sensor 6 measures a first three-dimensional scene S0 inside the housing 8 devoid of any object.

In a second step 2, the sensor 6 of the flight time type determines a second scene S1 inside the housing 8.

In step 3, the comparison step MC compares each measurement of distance of the second three-dimensional scene S1 with the measurements of distance of the first scene S0, and then determines the presence or the absence of the object 9 in the housing 8.

This entails a comparison step during which the said first scene S0 is compared with the second scene S1 followed by a step of determining the presence or the absence of the object 9 in the housing 8, on the basis of the result of the comparison.

As long as the housing 8 is empty, the values of distances of the first scene S0 and of the second scene S1 are equal. The processor 7 implementing step MD determines on the basis of the comparison results provided by the comparison step MC whether the housing 8 is empty.

If all the values of the scenes S0 and S1 are equal, that is to say if the comparison step MC has not determined any difference between at least one value of the scene S0 and the corresponding value of the scene S1, the determination step MD determines that the housing 8 is empty.

If at least one value of the scene S0 the corresponding value of the scene S1 are different, the comparison step MC determines a difference between the scenes S0 and S1, and then the determination step MD determines that the housing 8 is not empty and contains at least one object.

If the housing 8 does not contain any object, the method of FIG. 3 returns to step 2.

After a duration t fixed by the timeout step MT, for example 300 seconds, a new three-dimensional scene is determined by the sensor 6 until the presence of an object in the housing 8 is detected. Stated otherwise, the second step is repeated at a regular interval.

If the housing 8 contains an object (for example the object 9 has been introduced into the housing 8), the value of the distances measured between the object 9 and the face 1 of the second scene S1 which are situated above the surface defined by the projection of the object 9 on the surface f2, in this instance a rectangle delimited by the distances L19 and I19, is equal to H1. The comparison step MC determines that the value H1 is different from the value H0. The determination step MD deduces from the difference of the values measured by the sensor 6 that the object 9 has been introduced into the housing 8.

If an object has been detected in the housing 8, the method shown in FIG. 3 proceeds to step 4. A third three-dimensional scene S2 is recorded after the duration t has elapsed reckoning from the end of step 3.

In step 5, the values of distances of the first and third scenes S0 and S2 are compared. If the comparison step MC determines that the values of the scenes S0 and S2 are equal, the determination step MD deduces therefrom that the object 9 has been removed and the method shown in FIG. 3 returns to step 1.

A second comparison is performed between two successive second steps and a possible removal of the object is determined on the basis of the second comparison.

If at least one value of the first scene S0 and the corresponding value of the third scene S2 are different, as explained previously, the determination step MD deduces that at least one object is present in the housing 8. Stated otherwise, the object 9 is still in the housing 8 or the object 9 has been removed and another object has been introduced into the housing 8 or objects have been added into the housing 8.

In step 6, the sensor 6 records a fourth three-dimensional scene S3 after a duration t reckoning from the end of step 5.

As described in step 5, the comparison step MC compares in the following step 7 the first scene S0 with the fourth scene S3.

If the determination step MD deduces that the housing 8 is empty, the method illustrated in FIG. 3 returns to step 1.

If the determination step MD detects the presence of at least one object in the housing 8, in step 8, the sensor 6 records a fifth three-dimensional scene S4. On the basis of the scene S4, the first calculation step MCV calculates the value V1 of the housing 8 occupied by at least one object present in the housing 8.

Stated otherwise, the volume occupied by the said object 9 in the said housing 8 is calculated.

Next, the second calculation step MCT determines the degree of occupancy T (expressed as a percentage) of the housing 8 by dividing the volume V1 by the volume V0 and multiplying the result obtained by 100.

Stated otherwise, a degree of occupancy T of the said housing 8 is calculated, and then the method shown in FIG. 3 continues with step 2.

Figure 4:
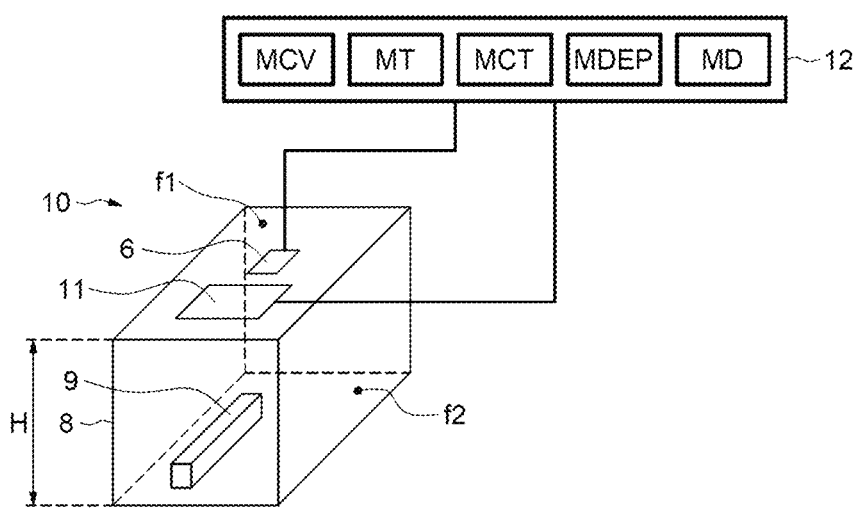

Referring to FIG. 4, which represents an exemplary embodiment of a device 10 for detecting the presence or the absence and motion of at least one object in the cubic-shaped housing 8.

The device 10 for detecting presence and motion of an object includes the sensor 6 and a second sensor 11 identical to the sensor 6 configured to measure several distances so as to establish in real time a three-dimensional scene (i.e. a distance), a processing unit 12 that implements the steps MCV, MT and MCT described previously.

The processing unit 12 is embodied for example on the basis of a microprocessor, but it may be any device able to process the data provided by the sensors 6 and 11. It may in particular be a microcontroller.

Here, the steps MCV, MT, MCT are incorporated into and/or performed by the processing unit 12.

The processing unit 12 furthermore executes the determination step MD configured to determine two items of information regarding presence of the object on the basis of three-dimensional scenes respectively measured by the two sensors 6 and 11.

Furthermore, the processor 12 executes a further determination step MDEP configured to determine a displacement of the object 9 inside the housing 8 on the basis of the two items of presence information respectively associated with the two sensors 6 and 11.

The further determination step MDEP can be embodied for example in software form within a microprocessor, but one may be dealing with any device (e.g. digital or analog device) able to determine a motion of the object inside the housing on the basis of the results provided by the two sensors. It may in particular be a microcontroller or a part of the processing unit 12 as represented here.

The further determination step MDEP implements a motion recognition algorithm known to the person skilled in the art.

Although the exemplary embodiment describes a housing of cubic shape and an object of uniform height and of uniform width, it would be possible to have a housing of any shape, and one or more objects of variable height and/or of variable width.

The sensors 6 and 11 are disposed on the face f1 so that the sensors 6 and 11 view the face f2. The sensor 11 is disposed at a different location from the sensor 6.

Figure 5:
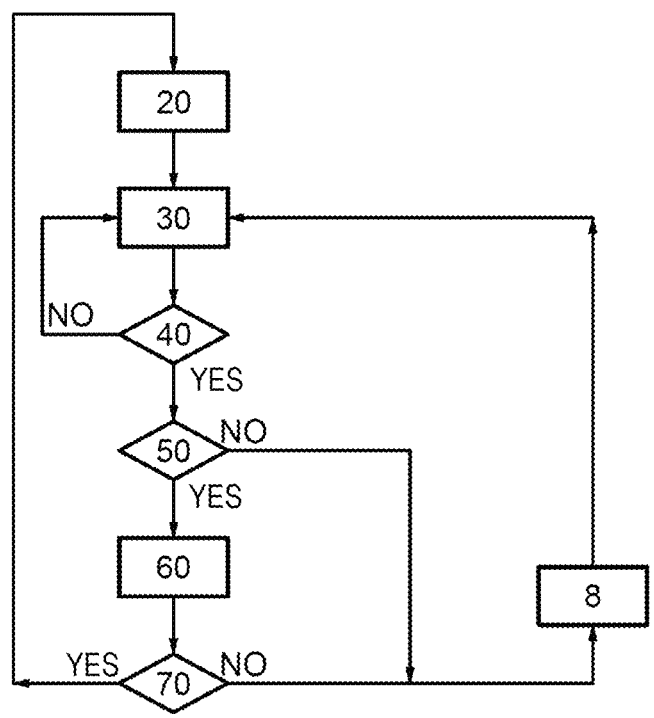

FIG. 5 illustrates an exemplary implementation of a method for detecting the presence of the object and motion of the object in the housing 8 implementing the device 10.

To improve the clarity and the understanding of the implementation of the method, the housing 8 includes a single object 9.

In a first step 20, the housing 8 does not contain any object, that is to say the housing 8 is empty. The sensors 6 and 11 each measure a first three-dimensional scene respectively S06 and S011 including the face f2. As the housing 8 is of cubic shape and the two faces f1 and f2 are separated from one another by the distance H, the sensors 6 and 11 each measure a reference distance respectively H06 and H011 of value equal to the value H for the scenes S06 and S011 together. The first calculation step MCV determines the value V0 of the volume of the empty housing 8 on the basis of one of the scenes S06 and S011.

Next in a step 30, the sensors 6 and 11 each measure a second three-dimensional scene respectively S16 and S111.

In step 40, the motion recognition algorithm implemented by the further determination step MDEP determines whether an object has moved by comparing respectively the scenes S06 and S011 with the scenes S16 and S111 recorded by the sensors 6 and 11.

The algorithm determines whether an object has been introduced into the housing 8.

Stated otherwise, the first step 1, the second step 2 and step 3 are reproduced for a second sensor 11 of flight time type, and a displacement of the object inside the housing is determined on the basis of the two determination steps respectively associated with the two sensors.

As long as the housing 8 is empty, the values of distances of the scenes S06 and S011 and of the scenes S16 and S111 are equal and the method shown in FIG. 5 returns to step 30.

After a duration t fixed by the timeout step MT, for example every second, the sensors 6 and 11 each measure a three-dimensional scene until the presence of an object in the housing 8 is detected. Stated otherwise, a scene is measured at regular intervals of fixed duration.

If an object has been detected in the housing 8, the method shown in FIG. 5 proceeds to step 50. It is assumed hereinafter that the object 9 has been introduced into the housing 8.

The sensors 6 and 11 record a new scene respectively S26 and S211 after the duration t has elapsed reckoning from the end of step 40.

Next the further determination step MDEP determine whether the object 9 has been removed from the housing 8 or whether an object has been added into the housing 8 by comparing respectively the scenes S16 and S111 with the scenes S26 and S211.

If the object 9 has not been removed from the housing 8 and no other object has been added into the housing 8, the method shown in FIG. 5 proceeds to step 8 described previously and thereafter continues with step 30.

If the object 9 has been removed from the housing 8 or an object has been added into the housing 8, the method shown in FIG. 5 proceeds to step 60.

The sensors 6 and 11 each measure respectively a scene S36 and S311.

The first calculation step MCV determines the value of the volume V2 occupied by the at least one object present in the housing 8.

Next in step 70, the second calculation step MCT determines the degree of occupancy T1 (expressed as a percentage) of the housing 8 by dividing the value V2 by the value V0 and multiplying the value obtained by 100.

If the value of T1 is equal to 100%, that is to say the values V0 and V2 are equal, the further determination step MDEP deduces that the housing 8 is empty and the method shown in FIG. 5 proceeds to step 20.

If the value of T1 is less than 100%, the housing 8 is not empty and the method shown in FIG. 5 proceeds to step 8.

Figure 6:
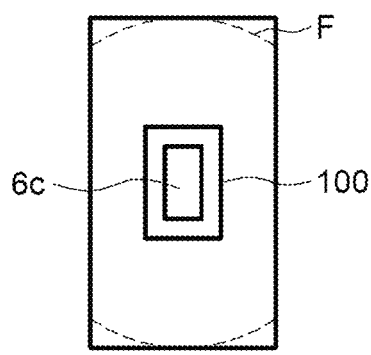

FIG. 6 illustrates another exemplary embodiment of a time of flight sensor 6c identical to the sensor 6 including a lens 100 so that the field of the sensor 6c covers the whole of the scene F.

Advantageously, only the sensor 6c is required in order to cover the scene F.

The examples of presence and motion detection devices described operate whatever the shapes, the colors and the materials of the objects to be detected, while optimizing the consumption of the devices through intermittent monitoring.

One or more three-dimensional scenes are recorded by each sensor for example every 300 seconds. This reduces the electrical consumption of the detection devices with respect to the devices of the prior art which operate continuously.

The devices operate for any shape of housing to be monitored without adjustment step, indeed the initialization step does not depend on the shape of the housing to be monitored.

The ToF sensors exhibit satisfactory measurement precision to 2 m.

What is claimed is:

1. A method for detecting an object in a housing, the method comprising:
    determining a first scene inside the housing using a time of flight (ToF) sensor, the ToF sensor disposed within the housing at a first internal surface of the housing, the determining comprising:
        emitting a signal from the ToF sensor towards a second internal surface of the housing that is opposite to the first internal surface, the ToF sensor arranged at the first internal surface such as to measure a distance between the first internal surface and the second internal surface, and
        detecting a signal reflected from a direction from the second internal surface at the ToF sensor, the first scene comprising a first plurality of depth information corresponding to the second internal surface of the housing, the object being absent from the housing during the determining of the first scene;
    determining, by a processor, a second scene inside the housing using the ToF sensor, the determining comprising:
        pointing the ToF sensor towards the second internal surface, and
        detecting a signal reflected from the direction from the second internal surface at the ToF sensor, the second scene comprising a second plurality of depth information;
    comparing, by the processor, the first scene with the second scene; and
    determining, by the processor, a presence or an absence of the object in the housing based on a result of comparing the first scene with the second scene.

2. The method according to claim 1, further comprising repeating the determining the second scene inside the housing at a regular interval.

3. The method according to claim 2, further comprising:
    determining, by the processor, that the object is present in the housing;
    comparing, by the processor, successive second scenes obtained from repeating the determining the second scene inside the housing at the regular interval; and
    determining, by the processor, whether the object has been removed from the housing based on a result of comparing successive second scenes.

4. The method according to claim 1, furthermore comprising:
    determining, by the processor, that the object is present in the housing; and
    determining, by the processor, a volume occupied by the object in the housing.

5. The method according to claim 4, furthermore comprising determining, by the processor, a degree of occupancy of the housing.

6. The method according to claim 1, further comprising:
    determining a third scene inside the housing using a second time of flight sensor, wherein the housing is empty during determination of the third scene;
    determining a fourth scene inside the housing using the second time of flight sensor;

comparing, by the processor, the third scene with the fourth scene;

determining, by the processor, the presence or the absence of the object in the housing based on a result of comparing the third scene with the fourth scene; and determining, by the processor, a displacement of the object inside the housing based on the result of comparing the first scene with the second scene and the result of comparing the third scene with the fourth scene.

7. The method according to claim 1, wherein each of the first scene and the second scene comprises a three-dimensional scene.

8. The method according to claim 1, wherein the signal is of the electromagnetic wave type, and wherein determining the first scene further comprises emitting the signal to substantially cover the second internal surface.

9. A device for detecting a presence or an absence of an object in a housing, the device comprising:
 a time of flight (ToF) sensor attached at a first internal surface within the housing, the time of flight sensor configured to determine a first scene of the housing and a second scene of the housing subsequent to the first scene by emitting a signal from the ToF sensor towards a second internal surface of the housing that is opposite to the first internal surface and detecting the signal reflected from a direction from the second internal surface at the time of flight sensor, the first scene comprising a first plurality of depth information corresponding to the second internal surface of the housing, the second scene comprising a second plurality of depth information, the ToF sensor arranged at the first internal surface such as to measure a distance between the first internal surface and the second internal surface; and
 a processor configured to:
  compare the first scene with the second scene; and
  determine a presence or an absence of the object in the housing based on a result of comparing the first scene with the second scene.

10. The device according to claim 9, wherein the processor is further configured to execute a timeout step that causes the time of flight sensor to repeat determinations of the second scene at regular intervals.

11. The device according to claim 9, wherein the processor is further configured to calculate a volume occupied by the object in the housing.

12. The device according to claim 11, wherein the processor is further configured to calculate a degree of occupancy of the housing.

13. The device according to claim 9, wherein the housing is empty during determination of the first scene.

14. The device according to claim 9, furthermore comprising a second time of flight sensor configured to determine a third scene and a fourth scene inside the housing.

15. The device according to claim 14, wherein the processor is further configured to:
 compare the third scene with the fourth scene;
 determine the presence or the absence of the object in the housing based on a result of comparing the third scene with the fourth scene; and
 determine a displacement of the object inside the housing based on the result of comparing the first scene with the second scene and the result of comparing the third scene with the fourth scene.

16. The device according to claim 14, wherein the housing is empty during determination of the third scene.

17. The device according to claim 9, wherein each of the first scene and the second scene comprises a three-dimensional scene of contents of the housing.

18. The device according to claim 9, wherein a field of view of the time of flight sensor substantially covers the second internal surface.

19. A device for detecting a presence or an absence of an object in a housing, the device comprising:
 a time of flight (ToF) sensor attached at a first internal surface within the housing, the time of flight sensor configured to determine a first scene inside the housing and determine a second scene inside the housing subsequent to the first scene by emitting a signal from the ToF sensor towards a second internal surface of the housing that is opposite to the first internal surface and detecting the signal reflected from a direction from the second internal surface at the time of flight sensor, the first scene comprising a first plurality of depth information corresponding to the second internal surface of the housing, the second scene comprising a second plurality of depth information, the object being absent from the housing during determination of the first scene, the ToF sensor arranged at the first internal surface such as to measure a distance between the first internal surface and the second internal surface;
 a processor; and
 a non-transitory computer-readable storage medium storing a program to be executed by the processor, the program including instructions for:
  comparing the first scene with the second scene; and
  determining a presence or an absence of the object in the housing based on a result of comparing the first scene with the second scene.

20. The device according to claim 19, wherein the program further includes instructions for repeating determination of the second scene inside the housing at a regular interval.

21. The device according to claim 19, wherein the program further includes instructions for determining that the object is present in the housing, and determining a volume occupied by the object in the housing.

22. The device according to claim 19, wherein the program further includes instructions for determining a degree of occupancy of the housing.

* * * * *